though the pressure in outlet 16 is regulated by the small pressure regulator. The additional details of this pressure regulator involve the use of spring 34 urging the valve

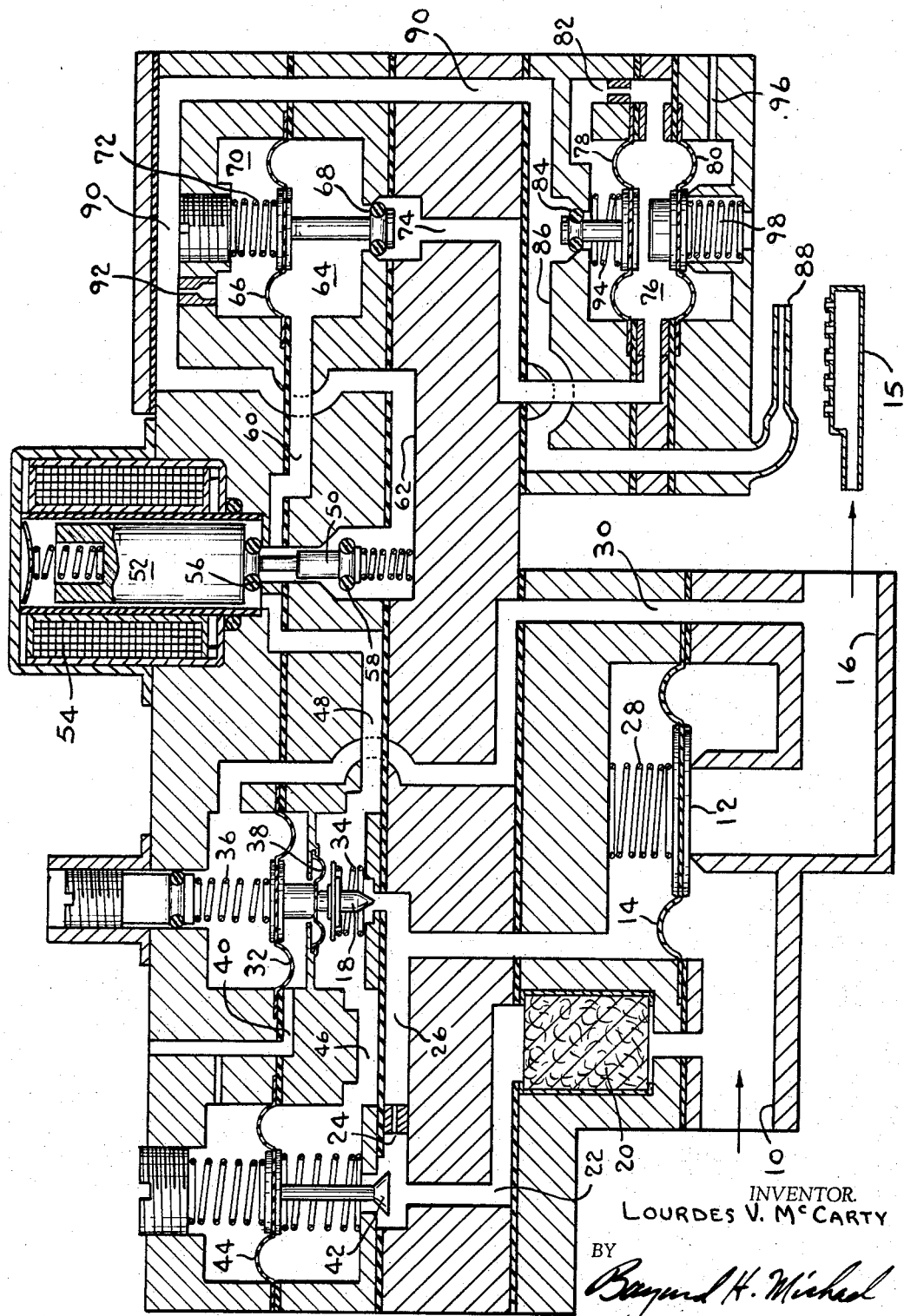

United States Patent Office 3,373,765
Patented Mar. 19, 1968

3,373,765
ELECTRIC RESET FOR PNEUMATIC SENSOR CONTROL
Lourdes V. McCarty, Milwaukee, Wis., assignor, by mesne assignments, to Controls Company of America, Melrose Park, Ill., a corporation of Delaware organized in 1966
Filed Oct. 23, 1965, Ser. No. 502,842
7 Claims. (Cl. 137—489)

This invention relates to a control system for a gas fired burner.

Patent application Ser. No. 406,233, now Patent No. 3,295,586, shows various applications of a control control concept utilizing the change in pressure incident to sensing heat to accomplish various control functions. The application shows the concept applied to systems ranging from very simple or elementary controls to a complete control system for a gas fired burner. The present invention is concerned with the latter application and seeks to both simplify the control and improve the operating characteristics. The system shown in FIG. 4 of said application contemplates the use of an electrically operated valve adapting the system for control by a room thermostat and in such instances the system would tend to pass a surge of gas to the main burner both on ignition and on shutdown. The present control overcomes this problem. The patent application construction also required a manual reset to take the control out of the "lockout" condition following failure of ignition or plugging of the sensor. The present design avoids the need for manual reset at the control by incorporating the reset feature in the electrically operated valve whereby merely closing and reopening the valve will achieve reset.

The principal object of this invention is to eliminate the manual reset required in the prior control shown in said application.

A further object is to eliminate the surge characteristics on opening or closing the main valve of the prior control system. This feature is applicable to systems not using the present sensing arrangement but using servo pressure reguation of a main gas valve.

Other objects and advantages will be pointed out in, or be apparent from, the specification and claims, as will obvious modifications of the single embodiment shown in the drawings, in which the single drawing is a schematic representation of a control according to the present invention.

The gas will enter inlet 10 and flow past the main valve 12 carried by diaphragm 14 to go to the main burner 15 via the outlet 16. Operation of the main valve is controlled by controlling the pressure above diaphragm 14. This pressure is controlled by the operation of a pilot regulator controlling movement of valve 18. Thus there is a branch conduit leading from the inlet 10 through filter 20 into conduit 22 and there is a restriction 24 in the branch 26 allowing restricted flow to the space above the main valve diaphragm 14. If valve 18 is closed it will be appreciated that the pressure above the diaphragm will reach the same pressure as that in inlet 10 and this pressure coupled with the presence of spring 28 will close valve 12. Movement of the valve 18 is regulated to regulate the pressure in outlet 16. This is accomplished by leading the pressure in outlet 16 through conduit 30 to the topside of the pilot regulator diaphragm 32. Obviously a pressure increase here will tend to close valve 18 and when the pressure above diaphragm 32 is adequate to overcome the spring bias opening valve 18, the valve 18 will tend to close and thus permit an increase in pressure above the main valve diaphragm 14 which will tend to throttle valve 12 and reduce pressure in the outlet 16.

Thus, the pressure in outlet 16 is regulated by the small pressure regulator. The additional details of this pressure regulator involve the use of spring 34 urging the valve open while an opposing adjustable spring 36 biases the diaphragm downwardly to tend to close the valve. The net spring force is in the opening direction, the two springs having been employed to permit easy adjustment of the regulated pressure. It will be noted that a sealing diaphragm 38 is also mounted on the valve stem and the space between the two diaphragms is vented to atmosphere through conduit 40. This sealing diaphragm prevents surging of the regulator valve and hence of the main valve when the main valve is either opened or about to close. For reasons which will appear more fully hereinafter, when the main valve has been closed, line pressure will exist below diaphragm 38 and if this were permitted to act directly against diaphragm 32 as in said prior application, the pressure could not build up fast enough above diaphragm 32 when the main valve is opened to prevent substantial line pressure being applied to the outlet 16. However, with the present construction line pressure will rise only slightly above that ultimately to be maintained in the outlet.

It will be noted that conduit 22 also leads past regulator valve 42 carried by diaphragm 44 which of course tends to maintain a given outlet pressure on the underside of the diaphragm 44. The chamber above diaphragm 44 is vented to atmosphere in accordance with common practice. Valve 42 therefore will act to regulate pressure on the underside of diaphragm 38 through conduit 46. This regulated pressure is then applied through conduit 48 to three-way valve 50 carried by armature 52 slidable inside the coil 54. This solenoid operated valve is shown in the closed position and in this position flow cannot take place past the valve member (O-ring) 56. Under these conditions, however, the lower valve 58 is unseated and permits communication between conduit 60 and conduit 62 for purposes which will be explained more fully hereinafter. When the coil 54 is energized valve 56 will be unseated while valve 58 will seat and now flow can take place from conduit 48 to conduit 60. This flow goes into chamber 64 below diaphragm 66. The diaphragm carries valve 68 which will be closed as shown in the event the pressure below the diaphragm in chamber 64 is less than a predetermined amount. If, however, the pressure applied to chamber 70 above diaphragm 68 is at a given value, it will overcome, in conjunction with the spring 72, the pressure applied below the diaphragm and will hold the valve open. Assume for a moment that this valve is open. This then allows flow from the solenoid valve through conduit 60 to chamber 64 and then to conduit 74 which leaves the chamber 76 between diaphragms 78 and 80. Flow from this chamber passes through restriction 82 to the chamber above the diaphragm 78 and then can go past valve 84 to conduit 86 leading to the restricted capillary 88 which is designed to be placed where the flame of the burner will heat the capillary. It will be noted that the downstream side of valve 84 also communicates with conduit 90 and the pressure obtaining in this conduit can be communicated to chamber 70 above diaphragm 66 through restriction 92. This conduit also communicates with conduit 62 leading to the underside of the three-way valve 50.

As pointed out in the above-mentioned application if the restriction 88 is heated, this will reflect as a pressure increase in conduit 86 and also in conduit 90. This pressure increase will be communicated to chamber 70 above diaphragm 66 and that pressure in conjunction with the force of spring 72 will act to hold valve 68 open. If however, ignition fails to take place and the capillary 88 is not heated, the pressure in conduit 86 and conduit 90 and in chamber 70 will not be as high and spring 72 with the lesser pressure in chamber 70 will be inadequate to overcome the pressure in chamber 64 below diaphragm 66 and valve 68 will be closed. This then is the ignition proving or flame sensing arrangement.

If the flow is stopped by closing valve 68, it will be appreciated that the pressure in conduit 60 and 48 will start building up and this will in turn reflect in a pressure increase in the chamber above the main valve diaphragm 14 and this will close the main valve. Therefore, even if valve 56 is open there can be no flow to the main burner. In the above-mentioned application under these conditions it was necessary to manually reset the control. In the present arrangement, however, it is necessary to only deenergize coil 54 to allow valve 56 to close and open valve 58. This permits the line pressure previously applied to the underside of diaphragm 66 in chamber 64 to be vented through conduit 60 to conduit 62 and thence to conduit 90 and out through the restriction 88. Having thus vented the pressure in chamber 64 and having allowed enough time the the spring 72 to move the valve 68 to its open position, the coil 54 can be reenergized to open the valve 56. The application of pressure under diaphragm 66 in chamber 64 will not immediately act to close valve 68 since restriction 92 functions to introduce a time delay to expel the gas in chamber 70. Before this can occur the control is designed to allow for adequate buildup of pressure in chamber 70 by way of heating the restriction 88.

It will be noted that diaphragm 78 carrying valve 84 is biased in the valve closing direction by spring 94. This spring and diaphragm are selected to close valve 84 at a pressure somewhat greater than that which results from heating the capillary 88. This valve is designed therefore to be closed if the restriction 88 tends to get plugged. Thus, as the plugging occurs (which would otherwise tend to hold everything open as if ignition had occurred) the pressure above diaphragm 78 will build up to a point at which valve 84 will close. As soon as valve 84 closes, the pressure in chamber 70 will experience a pressure decrease so that the pressure in chamber 64 will close valve 68 and the main valve will close as above described. The valve 84 would tend to stay closed when pressure is removed from chamber 76. Therefore, it would be impossible to re-establish flow to the capillary 88. To overcome this problem another diaphragm 80 is mounted on the underside of chamber 76 with the chamber below diaphragm 80 being vented through vent 96 to atmosphere. This diaphragm is biased by spring 98 in the upward direction. The normal operating pressure in chamber 76 is sufficient to move this diaphragm down to the position shown. However, removal of pressure in chamber 76 will permit the spring to move the diaphragm upwardly and act against diaphragm 78 to open valve 84. Therefore, when the solenoid valve 56 is opened, for example, the valve 84 will be opened and hence flow can occur past the valve and ultimately to the restriction 88. In the meantime, the pressure in chamber 76 will move diaphragm 80 out of its operative position to insure that valve 84 can close if the restrictor 88 should plug.

It will be understood that the solenoid valve is in circuit with the room thermostat and when the room thermostat requires or calls for heat, the coil 54 is energized and the operation will occur as above mentioned. After the room thermostat is satisfied the valve 56 closes and opens valve 58 to allow the pressures on the various diaphragms to stabilize in readiness for another operating cycle. If the ignition fails, valve 68 will be closed by reason of the pressure in chamber 64 overcoming the spring 72 and the pressure in chamber 70. If ignition occurs the pressure in chamber 70 will be higher than if there is not ignition and hence that pressure plus the force of spring 72 can hold valve 68 open against the pressure in chamber 64. Now if the control does lock out for ignition failure and the room thermostat is still calling for heat, valve 56 is open while valve 58 is closed and hence line pressure will be applied to chamber 64 to hold the valve 68 closed and at the same time line pressure is applied to the chamber above diaphragm 14 to hold the main valve closed. Hence, everything is safe. To try for ignition again it is necessary to only actuate the room thermostat to a low temperature setting and wait a few moments and then reset the room thermostat which will in the meantime have deenergized the coil to close valve 56 and open valve 58 and vent chamber 70 to atmosphere. This also will drop the pressure in chamber 64 to atmosphere and hence valve 68 will be opened by spring 72. Now when the room thermostat is reset to call for heat operation will occur as normally with the restrictor 92 introducing sufficient time lag to allow for a pressure buildup in chamber 70 consequent to ignition occurring and the resulting flame heating the restrictor 88. If the restrictor becomes plugged this will cause an even greater pressure buildup back of the restrictor and this will be felt on diaphragm 78 to close in opposition to the pressure in chamber 76. This then will let the pressure build up downstream of chamber 76 which ultimately reflects in the pressure above the main diaphragm 14 building up to line pressure to close main valve 12. Closure of the valve 84 in response to a plugged restrictor will also cut out the supply of pressure fluid to conduit 90 and hence allow the pressure in chamber 70 to be vented to the restrictor. This will permit valve 68 to close and the control would have to be reset as aforesaid. Closure of valve 68 would leave pressure trapped between this valve and valve 84 with the result that the valve 84 would tend to remain closed. When the electrically operated valve is actuated for reset this will allow valve 68 to open as mentioned before and this then will vent the pressure in conduit 74 whereupon the diaphragm 80 can move upward aided by spring 98 to open valve 84 and the system is then ready to operate again.

From the foregoing it will be appreciated that the manual reset has been eliminated through the provision of the three-way valve operated by the room thermostat. It will also be seen that the provision of the diaphragm seal 38 on the regulator valve 18 serves to stabilize the operation of the main valve upon opening. Without this seal the pressure acting below diaphragm 32 would start out at line pressure and before this could drop upon opening of valve 56, the pressure on the downstream side or in the outlet 16 would have to rise to a substantial value, but by isolating the control diaphragm 32 from the pressure upstream of valve 56, the effect of the outlet pressure acting on the topside of the control diaphragm 32 will be effective much more rapidly and prevent overopening the main valve. The diaphragm seal is also effective on closing since it will be apparent that on any of the lockout conditions or on closure of valve 56 the pressure tends to build up to line pressure and if this were applied to the underside of diaphragm 32 at the same time the main valve was tending to throttle, the main valve would tend to surge open until full line pressure or nearly full line pressure could be applied above diaphragm 14. Again the isolation of the diaphragm 32 provided by diaphragm 38 prevents this. The use of the seal diaphragm 38 is useful with any servo pressure regulation whether or not used with the present sensing arrangement.

Although but a single embodiment of the present invention has been illustrated and described, it will be apparent to those skilled in the art that various changes and modifications may be made therein without departing from the spirit of the invention or from the scope of the appended claims.

I claim:
1. A control system for regulating gaseous flow comprising:
    first and second conduits;
    a first restriction between the conduits;

a second restriction on the outlet of the second conduit;
a pressure regulated gas supply to the first conduit;
a first valve in the first conduit operative when closed to interrupt flow through the first conduit;
pressure responsive means regulating said valve to close the valve when the pressure in the second conduit is below a given value relative to the pressure in the first conduit and to open the valve when the pressure in the second conduit is above a given value relative to the pressure in the first conduit;
a control valve located between the gas supply and the first conduit and operative in one position to connect the supply to the first conduit and in another position to vent the first conduit.

2. A control system according to claim 1 including another valve located downstream of the first valve and operative when closed to interrupt flow to the second restriction, first pressure responsive means operating said another valve to close when the pressure in the second conduit is greater relative to the first conduit pressure then required to open the first valve, and second pressure responsive means for opening said another valve when the pressure in the first conduit is approximately atmospheric.

3. A control system according to claim 3 in which the control valve vents the first conduit through the second conduit and the second restriction.

4. A control system in which the structure of claim 1 is located in a by-pass flow path,
said flow path originating on the inlet side of a main valve,
the main valve regulating flow through a valve body having an inlet and an outlet,
a diaphragm carrying the main valve with one side exposed to inlet pressure and the other side being exposed to pressure in a chamber,
a restriction between the inlet and the chamber,
a regulating valve controlling flow from the chamber, means biasing the regulating valve open,
a diaphragm controlling the regulating valve and having one side exposed to pressure in the outlet whereby an increase in outlet pressure tends to close the regulating valve,
and means isolating the last named diaphragm from influence of the pressure on the outlet of the regulating valve.

5. A control system according to claim 4 in which the regulating valve is carried by a stem and the last named means is a small diaphragm sealing the stem, the space between the diaphragms being vented to atmosphere.

6. A flow controlling device comprising:
a valve body having an inlet and an outlet;
a main valve regulating flow between the inlet and outlet;
a main diaphragm carrying the valve and having one side exposed to inlet pressure and the other side exposed to pressure in a chamber;
a restricted conduit between the inlet and the chamber;
a pilot valve regulating flow from the chamber, said pilot valve having a stem;
a pilot diaphragm carrying the stem and having one side exposed to pressure in said outlet;
a control valve controlling flow from the outlet of the pilot valve; and
means minimizing the effect ont he pilot diaphragm of pressure increase on the outlet of the pilot valve incident to closure of the control valve.

7. A device according to claim 6 in which said means is a sealing diaphragm connected to the stem and having a small diameter compared to the pilot diaphragm, the space between the pilot and sealing diaphragms being vented to atmosphere.

References Cited

UNITED STATES PATENTS

| | | | |
|---|---|---|---|
| 2,000,002 | 4/1935 | Stockmeyer | 137—489 X |
| 2,653,768 | 9/1953 | Penn | 158—136 X |
| 3,307,785 | 3/1967 | Currie | 137—489 X |

M. CARY NELSON, *Primary Examiner.*

R. J. MILLER, *Assistant Examiner.*

UNITED STATES PATENT OFFICE
CERTIFICATE OF CORRECTION

Patent No. 3,373,765                            March 19, 1968

Lourdes V. McCarty

It is certified that error appears in the above identified patent and that said Letters Patent are hereby corrected as shown below:

Column 5, line 21, "then" should read -- than --; line 25, claim reference numeral "3" should read -- 2 --. Column 6, line 24, "ont he" should read -- on the --.

Signed and sealed this 30th day of December 1969.

(SEAL)
Attest:

Edward M. Fletcher, Jr.
Attesting Officer

WILLIAM E. SCHUYLER, JR.
Commissioner of Patents